United States Patent [19]
Fuerst et al.

[11] Patent Number: 5,857,698
[45] Date of Patent: *Jan. 12, 1999

[54] GAS GENERATOR FREE OF PYROTECHNICS

[75] Inventors: Franz Fuerst; Armin Stark, both of Muehldorf; Marc Winterhalder, Garching; Siegfried Zeuner, Munich, all of Germany

[73] Assignee: TRW Airbag Systems GmbH & Co. KG, Aschau am Inn, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 668,833

[22] Filed: Jun. 24, 1996

[30] Foreign Application Priority Data

Jul. 1, 1995 [DE] Germany ................ 195 24 094.4

[51] Int. Cl.⁶ .................................................. B60R 21/26
[52] U.S. Cl. ................ 280/737; 137/68.13; 137/68.19; 222/3
[58] Field of Search ................ 280/737, 736, 280/741; 137/68.13, 68.19, 68.23; 222/3, 5

[56] References Cited

U.S. PATENT DOCUMENTS

| | | |
|---|---|---|
| 2,515,835 | 7/1950 | Preston . |
| 3,088,478 | 5/1963 | Schimmel ................ 137/68.19 |
| 3,209,937 | 10/1965 | Hirst et al. . |
| 3,633,159 | 1/1972 | Dillman et al. . |
| 3,788,596 | 1/1974 | Maeda ................ 280/737 |
| 3,822,895 | 7/1974 | Ochiai ................ 280/737 |
| 5,069,478 | 12/1991 | Kim . |
| 5,098,123 | 3/1992 | Jones . |
| 5,152,550 | 10/1992 | Hoagland et al. . |
| 5,230,532 | 7/1993 | Blumenthal et al. . |
| 5,263,740 | 11/1993 | Frey et al. ................ 280/741 |

FOREIGN PATENT DOCUMENTS

| | | |
|---|---|---|
| 2049183 | 4/1971 | Germany . |
| 2032957 | 1/1972 | Germany . |
| 2046495 | 3/1972 | Germany . |
| 9104577 | 7/1991 | Germany . |
| 2281228 | 3/1995 | United Kingdom . |

*Primary Examiner*—Peter C. English
*Attorney, Agent, or Firm*—W. F. Fasse; W. G. Fasse

[57] ABSTRACT

A gas generator, in particular for vehicle passive restraint systems, is constructed without pyrotechnical components for gas production, gas release, or gas heating. The gas generator includes a compressed gas container having an opening that is releasably closed by a closure such as a burst diaphragm, and at least one electrical and/or magnetic device arranged to destroy or release the closure upon triggering. It is also possible to achieve gas heating without the use of pyrotechnical components by coupling electrical and/or magnetic energy from the electrical and/or magnetic device into the gas container and particularly into the gas contained therein.

18 Claims, 6 Drawing Sheets

GAS GENERATOR FREE OF PYROTECHNICS

FIELD OF THE INVENTION

The invention relates to gas generators, in particular for passive restraint systems in motor vehicles, including at least one closed, gas-filled, and pressurized gas container.

BACKGROUND INFORMATION

There are known restraint systems which are equipped with a gas bag (airbag) that is inflated by a gas generated by a gas generator. Two basic types are differentiated here: the purely pyrotechnical gas generator and the hybrid gas generator. With a purely pyrotechnical gas generator, ignition and gas generation are effected by the combustion of suitable pyrotechnical propellant agents (generally solid propellants). With a hybrid gas generator, only ignition and gas heating are effected by the combustion of suitable pyrotechnical propellant agents. Hybrid gas generators include a container filled with gas. This gas container is pressurized. To prevent premature release of the gas flow, the container is sealed by a closure in the form of a burst diaphragm. As this gas does not have to be first generated by pyrotechnical means, it is designated as cold gas. Furthermore, a hybrid gas generator comprises an igniter protruding into a combustion chamber, where the igniter, when triggered, will ignite a combustion source in the form of propellant disks, for example. This pyrotechnically generated gas, which is also designated as hot gas, destroys the closure allowing the cold gas to escape from the container. Hot gas and cold gas mix, and then the resulting gas mixture escapes to the outside through a discharge aperture and may then be used for blowing up an airbag or may be conveyed to another gas-consuming load.

However, a disadvantage of these arrangements is that the gas flow contains pollutants such as pollutant gases and combustion residues which are produced by the burning of the pyrotechnical components (propellant disks). The substances required for this purpose are highly explosive, thus necessitating special precautionary measures to be taken. This may cause damage to property and/or personal injury during manufacture and assembly. As the pyrotechnical components must maintain their functionality over a long period of time, on the one hand, but are also extremely sensitive to humidity on the other hand, the combustion chamber must be hermetically sealed. Moreover, a further pyrotechnical igniter is required for igniting the propellant disks, which also has the above-mentioned disadvantages. For disposal and/or recycling, the gas generator must either be first ignited or be opened up with great effort; and it can be into the recycling process only after it has first been cleaned of all contaminants.

SUMMARY OF THE INVENTION

An object of the invention is to provide a gas generator which does not use any pyrotechnical components and thus avoids the above-mentioned disadvantages.

According to the invention, the closure of the cold gas container will be removed or broken by means of electric, magnetic or a resulting kinetic or thermal energy. Further according to the invention, gas heating is achieved by coupling electric and/or magnetic energy into the gas generator.

According to advantageous further developments of the invention, several variants are provided for removing or destroying the closure, and/or heating up the cold gas. The invention further provides for a complete discharge of the vehicle battery caused by this energy consumption.

The advantages achieved by this invention are in particular that the closure of the cold gas container can be opened and/or the gas can be heated without pyrotechnical components in a quick and controlled fashion. In addition to achieving a simpler generator construction, gas generation according to the invention is absolutely free of any pollutants; there will be no harmful residues remaining in the gas generator. After use, the gas generator can be disposed of or recycled without any problems. A combustion chamber will no longer be needed. Pyrotechnical igniters are not required. The gas generator structure is reduced in size. Manufacture, assembly, and storage are simplified very considerably. Also, the discharge of the vehicle battery, if used as an energy source, prevents a vehicle fire in the event of an accident.

BRIEF DESCRIPTION OF THE DRAWINGS

Several examples of the invention will be described below with reference to several drawings, wherein.

DESCRIPTION OF THE PREFERRED EMBODIMENTS

Figure 1:
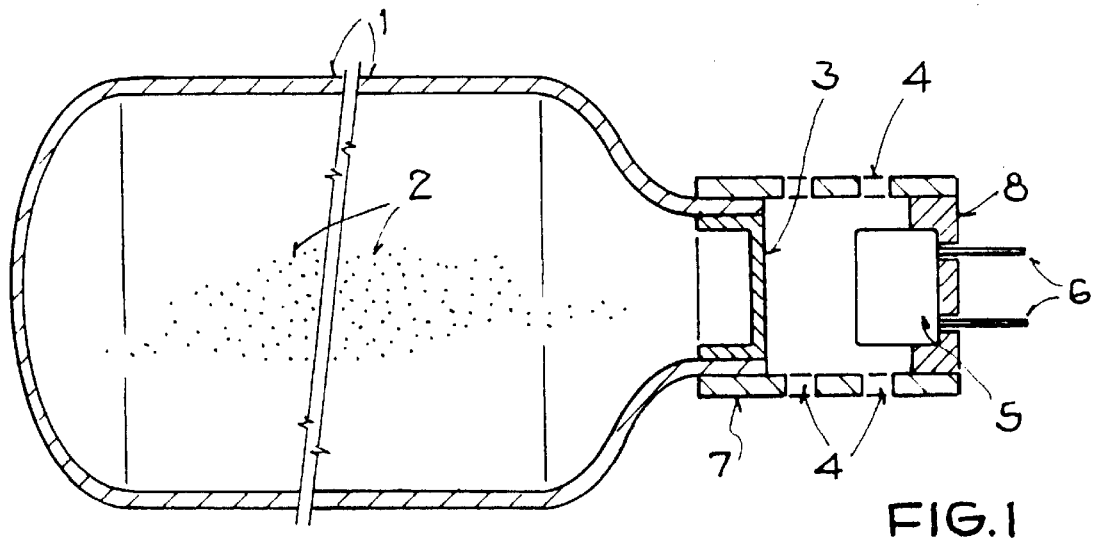
FIG. 1: shows a gas generator according to the invention complete with an energy source outside the gas cylinder.

FIG. 1 shows a cold gas container 1 in which the cold gas 2 is located. The cold gas container 1 is closed by a closure 3, e.g. in the form of a burst diaphragm, and is pressurized.

An ignition chamber housing 7 is mounted on the closure end of the cold gas container 1. The ignition chamber housing 7 is also fitted with outlet apertures 4 through which the gas is fed to the consuming device such as a gas bag. Opposite the closure 3, an energy source 5 is located in the ignition chamber; in the event of an ignition, this energy source 5 will remove or destroy the closure or relevant attachments thereof. As described later in relation to FIGS. 3–6, this can be done in various ways. The energy source 5 can be supplied with electrical power from the vehicle battery. After opening the closure, it is also possible to heat up the escaping cold gas 2 by coupling energy made available by energy source 5 into the container 1 and specifically into the gas 2. The contacts 6 of energy source 5 will be routed to the outside through an ignition chamber cover 8 which closes the ignition chamber. The gas, which has been heated up by the energy source 5, can flow out to the consuming device through the outlet apertures 4, which are arranged in a circle around the cylindrical wall of the ignition chamber housing 7.

Figure 2A:
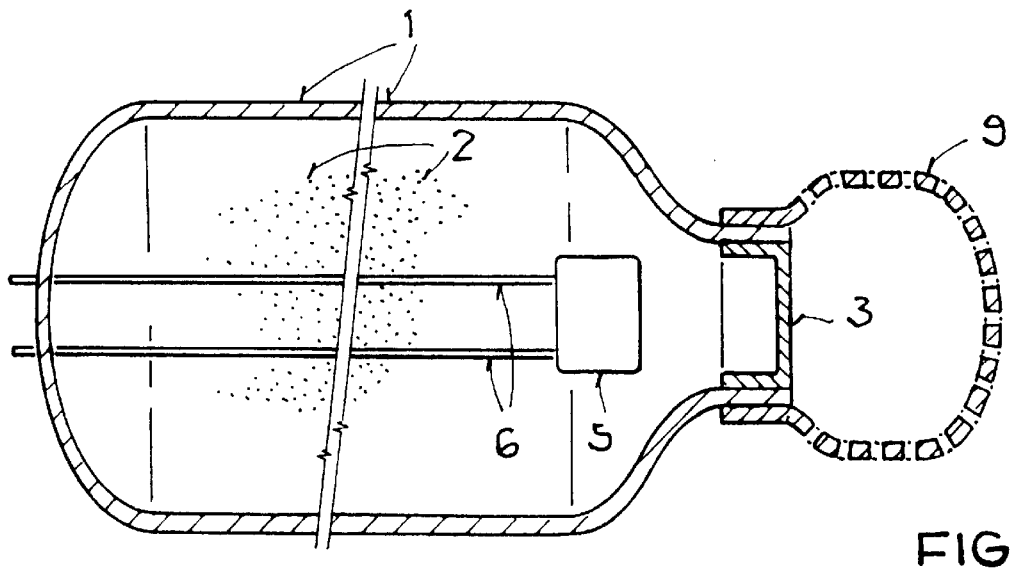
FIG. 2a: shows a gas generator according to the invention complete with an energy source inside the gas cylinder (with sieve).

FIG. 2a also shows a gas container 1 which contains cold gas 2. The gas container 1 is closed by a closure 3 and pressurized. However, this time the energy source 5—which is used for opening the closure and/or heating the gas—is located inside the gas container 1. In this case, closure 3 may be opened from the inside. Here, in the event of ignition, energy source 5 will cause the closure or relevant attachments thereof to be removed or destroyed. As described later in connection with FIGS. 3–6, this can be effected in various ways. After the closure has been opened, the gas 2 can again be heated by coupling energy made available by energy source 5 into the gas 2. Opening the closure and heating up the gas by coupling energy into the gas may also be effected simultaneously. The contacts 6 of energy source 5 are fed either through the wall of cold gas container 1 or through closure 3. Advantageously, in the event of closure 3 being destroyed, a sieve 9 fitted over the opening of the container 1 prevents ingress of fragments into a gas bag or another consuming device.

Figure 2B:
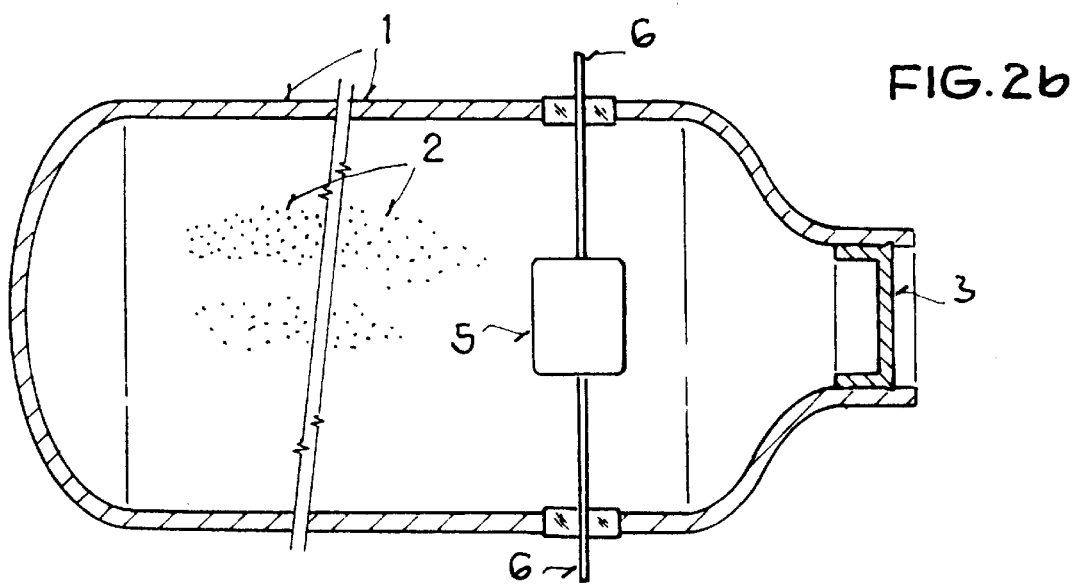
FIG. 2b: shows a gas generator according to the invention complete with an energy source inside the gas cylinder (without sieve).

In FIG. 2b, a further variant is illustrated. Here, all contacts 6 are attached to gas container 1. Therefore, supply leads may be attached on the inside of the container and tapped, via the housing, from outside; thus, the container walls need not be pierced. This Figure is also intended to illustrate that, e.g., in the event of an attraction force on closure 3 coming from energy source 5, it is unnecessary to provide a sieve or a similar filter material. Also, the energy source is located directly next to or in the gas so that the energy output here can contribute directly to the gas heat-up process. By means of various particular arrangements which can be implemented using various mechanical, magnetic, and electrical technologies, or resulting combinations thereof, (see FIGS. 3–6), overall dimensions can be achieved which are only dependent on the required size of the gas container.

Figure 3A:
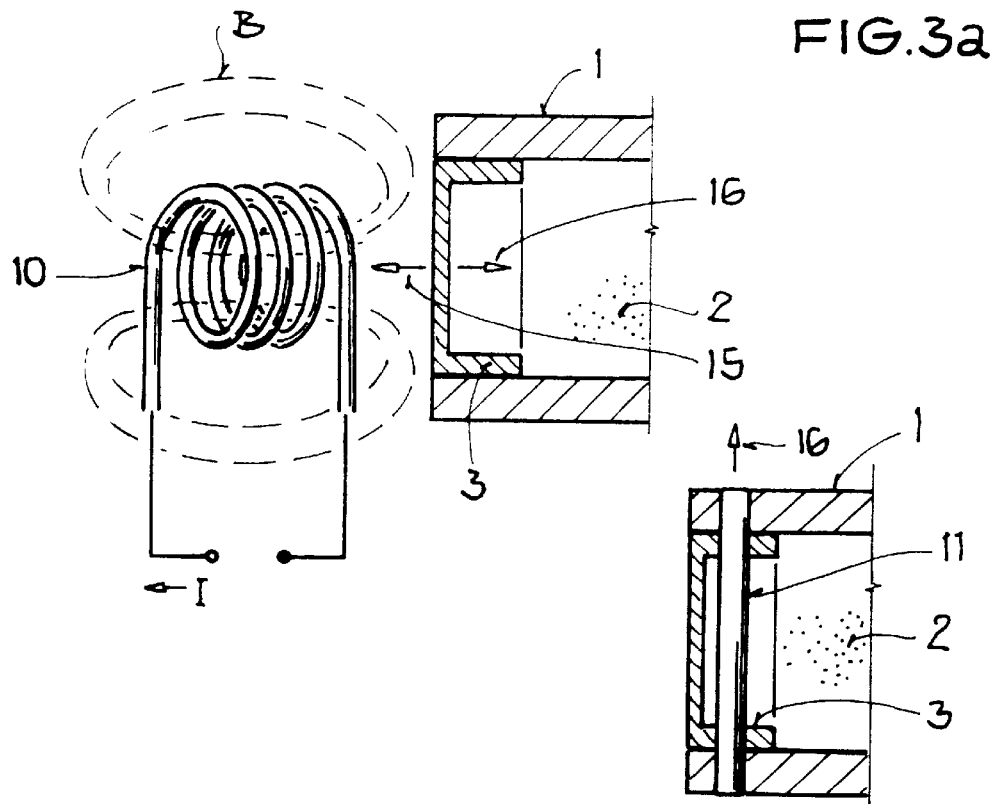
FIG. 3a: shows an opening mechanism based on magnetic attraction or repulsion of a burst diaphragm.

FIG. 3a illustrates how the opening mechanism and cold gas heat-up process operate if energy source 5 essentially consists of a coil.

If the energy required is to be taken from a coil 10 through which live current flows, then on ignition or triggering a current flow or current impulse will be initiated in the coil. This current flow I very quickly induces a magnetic field B. Magnetic poles are formed such that attraction forces 15 or repulsion forces 16 are exerted on magnetized or ferromagnetic materials. If closure 3 consists of ferromagnetic or magnetized materials, and if current flow I in coil 10 is sufficiently powerful, closure 3 will either be attracted or repulsed by the coil. If coil 10 is mounted in a fixed position, this closure 3 will either move toward or away from the coil. Cold gas container 1 will be opened.

It does not matter here whether the coil arrangement 10 is located internally, externally, or wound around cold gas container 1. It is also possible that cold gas container 1 may consist of a ferromagnetic or magnetized material, so that the entire gas container 1 will be accelerated and destroyed by deceleration when it impacts with an obstruction (e.g. a spike). This variant is not illustrated here.

Heating of the cold gas by means of a coil 10 can be achieved in various ways:

a) By pulsing coil 10, a suitable gas 2 or an appropriate additive in the gas (having atoms or molecules that form a dipole) are caused to vibrate and thus heated up.

b) Coil 10 behaves like a resistor and heats up as a result of the current flow; this in turn will heat up the gas when it flows past coil 10.

c) The gas or additives initiate a chemical reaction during electrical, magnetic, and/or mechanical opening, which heats up the gas. To this end, e.g., the cold gas container will contain an inert gas and reactive gas mixture such as Argon/$O_2$. On opening the burst diaphragm, metallic materials such as Mg, Al or Zr are ignited and thus a combustion of the metal (e.g. in the form of a wire) is initiated with $O_2$ (lightning cube principle); this produces a powerful heating effect. In the same way, on opening the burst diaphragm, a combustible gas or liquid gas mixture consisting of fuels such as $H_2$ or suitable hydrocarbons and oxidators such as $O_2$ or $N_2O$, which mixture is contained in the cold gas container together with an inert gas (such as Ar, $N_2$, $CO_2$), can be ignited.

d) On opening, the impact of closure 3 and coil 10—for instance—will cause a short circuit which produces discharge lightning that heats up gas 2 either directly or as described at c) above.

Figure 3B:
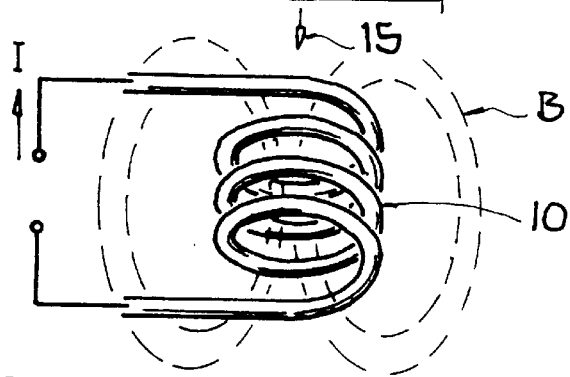
FIG. 3b: shows an opening mechanism based on magnetic attraction or repulsion of a burst diaphragm mounting.

FIG. 3b illustrates another possibility for opening a burst diaphragm 3 by means of a coil 10. Here, closure or burst diaphragm 3 is secured by means of ferromagnetic or magnetized attachments 11.

Provided current flow I in coil 10 is sufficiently powerful, these attachments 11 will either be attracted or repulsed by the coil when magnetic field B is generated. The attachments 11 will be detached, closure 3 is pushed toward the outside by the internal pressure of cold gas container 1, and gas 2 flows out to the consuming device. In this arrangement also, it does not matter whether the coil arrangement 10 is located internally, externally, or on cold gas container 1. Also, the attachments 11 may be located in any position. To avoid the need of providing a collecting sieve for attachments 11, these may be attached to the gas generator system by means of a holding device. This prevents the attachments 11 from entering into the gas bag or other consuming device. The gas is heated up in a fashion identical to the one described in connection with FIG. 3a.

Figure 3C:
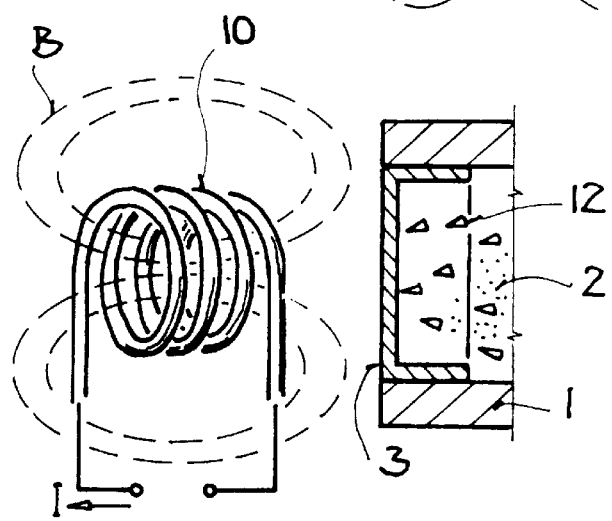
FIG. 3c: shows an opening mechanism based on magnetic attraction or repulsion of projectiles.
Figure 3D:
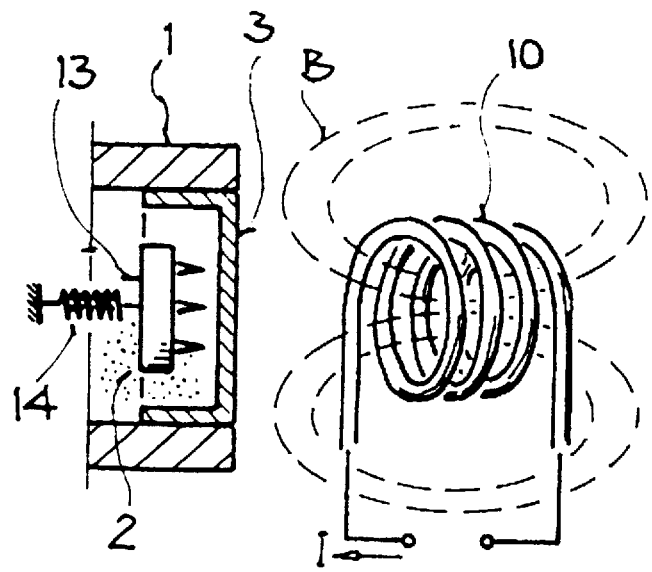
FIG. 3d: shows an opening mechanism based on magnetic attraction or repulsion of a spiked member.

FIG. 3c and FIG. 3d show two further implementation examples for opening closure 3 by means of the magnetic field of a coil 10. In FIG. 3c small ferromagnetic or magnetized projectiles 12, or in FIG. 3d ferromagnetic or magnetized spikes 13, are located within or without the gas container, which projectiles or spikes are either attracted or repulsed by coil 10 due to the application of magnetic field B. The coil can be located internally, externally, or wound around the gas container. Here, projectiles 12 or spikes 13 will be accelerated by magnetic field B which is in turn induced by a current flow or current impulse I.

The projectiles 12 pierce the burst diaphragm. Depending on how free they are in their movement, which may be determined by a suspension or flexible mounting device 14, the spikes 13 can pierce the burst diaphragm fully or partially, and then, e.g. by reducing, switching off, or pulsing the magnetic field, the spikes 13 can be retracted to open or release the pierced holes, or only parts thereof; in this way, a controlled flow of gas 2 will be achieved. The projectiles can be collected e.g. mechanically in a sieve or magnetically by another magnet. The gas is heated up in a fashion identical to the one described in connection with FIG. 3a.

Figure 4D:
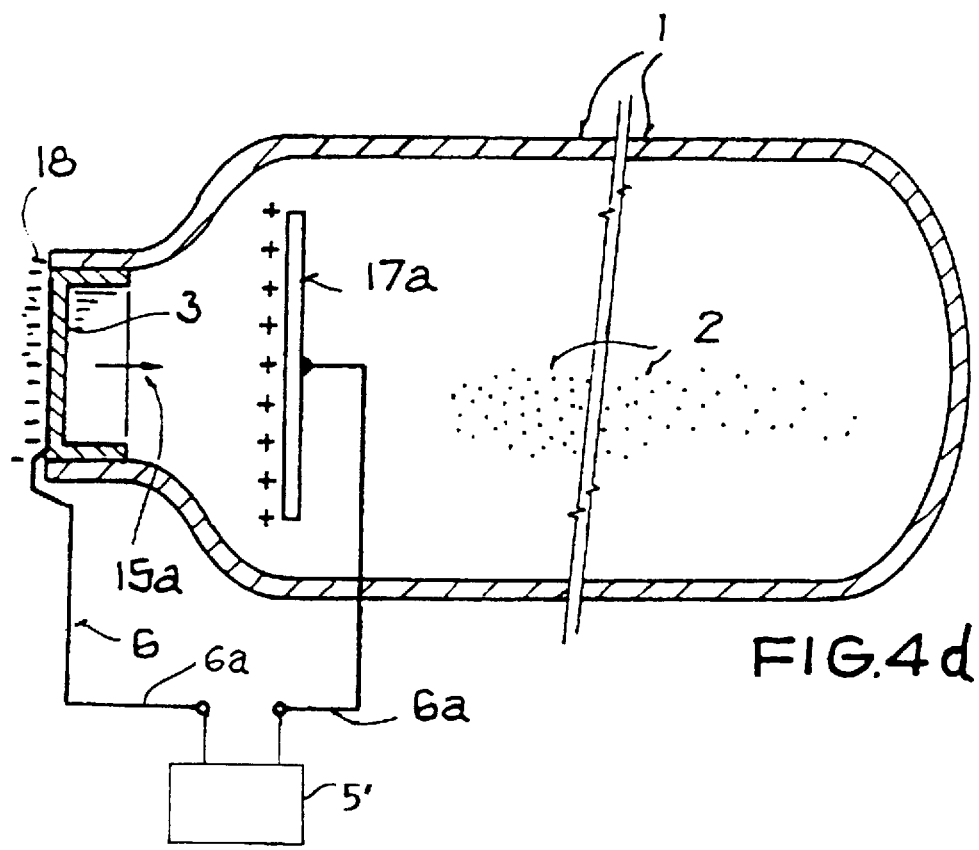
FIG. 4d: shows another embodiment of an opening mechanism based on electric attraction or repulsion of, or spark generation by, a first capacitor plate forming a closure, relative to a second capacitor plate.
Figure 4A:
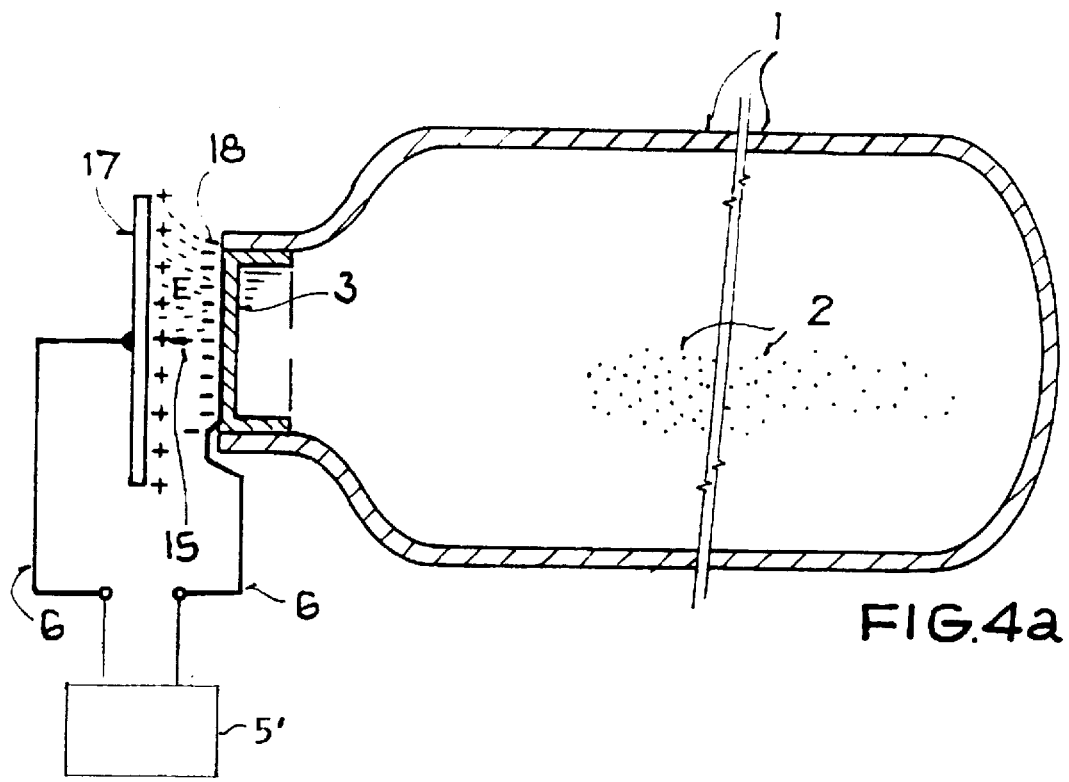
FIG. 4a: shows an opening mechanism based on electric attraction or repulsion of, or spark generation by, a first capacitor plate forming a closure, relative to a second capacitor plate;FIG.

FIG. 4a shows another implementation example in which a capacitor having poles 17 and 18 is used as energy source 5. Here, closure 3 arranged in the outlet aperture of container 1 itself forms one pole 18 of the capacitor. In this implementation example, closure 3 will be negatively charged and attracted to the other pole or electrode 17 due to the attraction forces of the positively charged other pole the container 17 located outside the container 1. Charging is effected via leads 6 from an electrical power source 5'. By means of the attraction forces 15 of both poles, the cold gas container 1 is opened, and the negatively charged closure 3 will be discharged at the other positive pole 17. During this discharge, energy will be output to the surrounding environment, i.e. the gas will be heated. As an alternative, a positively charged electrode in the form of a capacitor plate 17a, together with closure 3 and via the leads 6a, forms another capacitor as shown in FIG. 4d. Here, the negative pole 18 which may be formed by closure 3 is subjected to an attraction force 15a in the direction of pole 17a. It is also possible to achieve opening by means of the electrical field between the two poles 18 and 17a producing spark-overs or discharge lightning, i.e. an electrical discharge; in this way, the gas is heated and internal pressure rises. Due to the increased pressure differential the closure will be released from the container outlet aperture, i.e. the container will be opened. Implementation examples where the poles are charged up with the same charge, and therefore repulse each other, are also possible but not shown here. Also, it is not mandatory that closure 3 must provide a pole. Opening can also be achieved by transmitting electrical energy from an externally mounted capacitor(not shown), which energy is produced by a sudden discharge (e.g. short circuit) taking the form of a current flow or spark-over, directly to the diaphragm which is then pierced.

By means of a capacitor, the cold gas can be heated in various ways:

a) The gas is conducted in between capacitor plates 17, 18 and heated by discharge lightning and sparks between the capacitor plates.
  b) A gas 2, or additives contained therein, are neutralized at the charged up capacitor plates. This releases energy, and the gas will heat up.
  c) The gas or additives initiate a chemical reaction during electrical, magnetic, and/or mechanical opening, which heats up the gas. To this end, e.g., the cold gas container will contain an inert gas and reactive gas mixture such as Argon/$O_2$. On opening the burst diaphragm, metallic materials such as Mg, Al or Zr are ignited and thus a combustion of the metal (e.g. in the form of a wire) is initiated with $O_2$ (lightning cube principle); this produces a powerful heating effect. In the same way, on opening the burst diaphragm, a combustible gas or liquid gas mixture consisting of fuels such as $H_2$ or suitable hydrocarbons and oxidators such as $O_2$ or $N_2O$, which mixture is contained in the cold gas container together with an inert gas (such as Ar, $N_2$. $CO_2$), can be ignited.
  d) On opening the burst diaphragm, a short circuit is caused, e.g. by two capacitor plates 17 and 18 impacting; and the energy released in this process will heat up the gas.

Figure 4B:
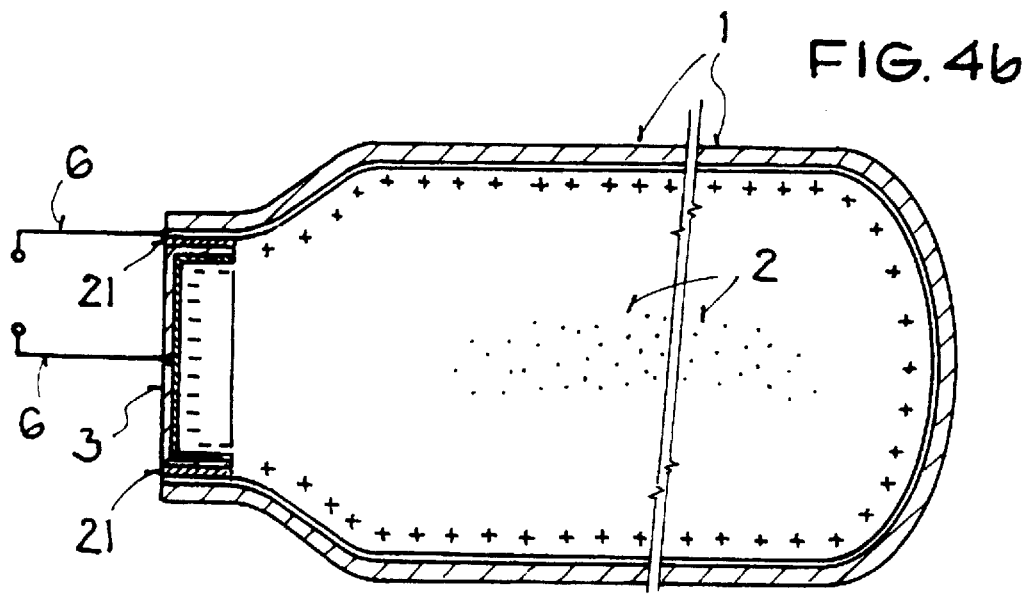
FIG. 4b: shows an opening mechanism based on electric attraction or repulsion of the container relative to the closure.

FIG. 4b, a further implementation of the capacitor solution is presented. Here, no separate capacitor or capacitor plate is required but gas container 1, together with closure 3, will form the two poles of a capacitor. An electric field is produced. The poles will attract or repulse each other. This opens closure 3 of gas container 1. By means of an appropriate construction design, it is also possible to initiate internal discharge events in the form of spark-overs or discharge lightning which will cause the gas 2 to heat up, increase internal pressure, and thus open the closure. Charging of the capacitor is effected via leads 6. The poles are electrically insulated from each other and the surrounding environment by an insulating protective layer 21 arranged between the container 1 and the closure 3. The gas is heated up in a fashion identical to the one described in connection with FIG. 4a.

Figure 4C:
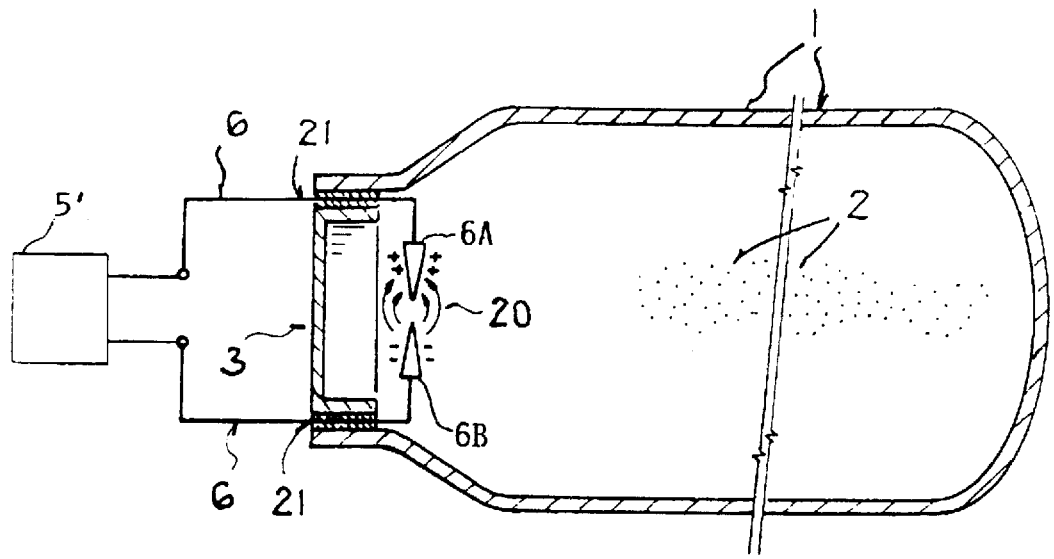
FIG. 4c: shows an opening mechanism based on spark generation using at least one electrode in the gas container.

FIG. 4c shows a further variant. The container 1 and closure 3 are electrically insulated from each other by means of an insulating material 21 and shielded externally. Even closure 3 is used as an insulator. Two poles or electrodes 6A and 6B are arranged in the container 3 adjacent the closure 3. Both poles 6A and 6B are charged via leads 6. If the charge density on the two poles 6A and 6B is sufficiently large, a discharge process 20 will be initiated. Energy is thereby released and used to increase the temperature of gas 2. This will cause an over-pressure on the inside of container 1 by means of which closure 3 is opened. Using suitable housing shapes, opening of the closure can be accelerated and gas heat-up optimized. The gas can also be heated in another way as described above in connection with FIG. 4a.

Figure 5:
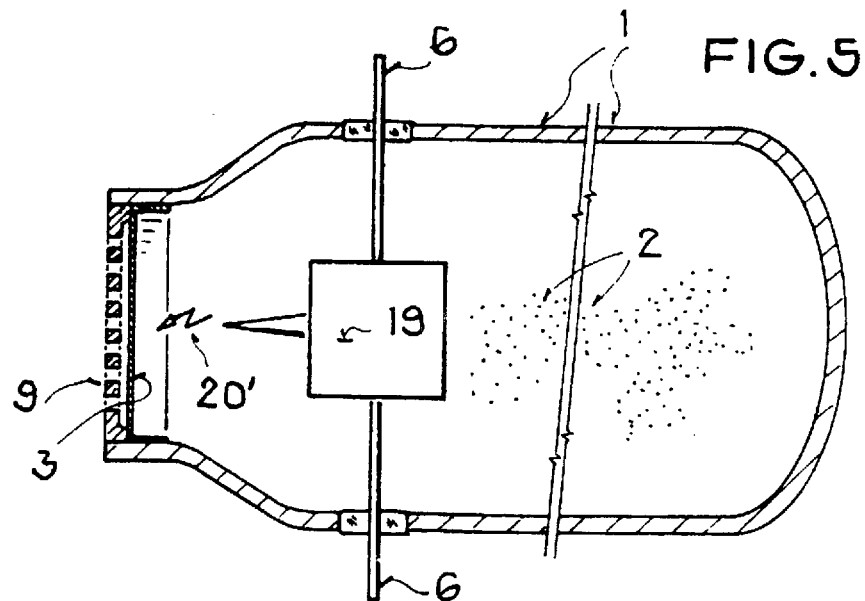
FIG. 5: shows an opening mechanism based on particle bombardment or discharge lightning caused by a generator.

If the energy source 5 comprises a current impulse generator, high voltage generator, and/or plasma generator 19 (as shown in FIG. 5), closure 3 will be bombarded with ionized particles (electrons, atoms, molecules) or a beam of particles 20' produced in the generator, until closure 3 is damaged and the holes produced in this way allow the cold gas to escape. Also, further variants as already described above in connection with FIGS. 3a–d and 4a–c can be implemented as such generators essentially comprise coils and/or capacitors, thus allowing magnetic forces or electrical repulsion and attraction forces to be used for direct opening of a gas container closure 3.

A further option not shown here consists of using a resistor—which, on application of a voltage, is heated up very strongly by the current flow—to destroy the closure. The resistor may be fitted either on, inside, or in the vicinity of the closure. The resistor may take the form of a wire or spike. This has the effect that the heat radiation gets directly into or upon the closure and destroys it. Here, to increase the triggering speed, it may make sense to keep the resistor at a predefined temperature by means of continuous operation thereof, so that only a very small temperature differential will be required to cause the device to be triggered. The heat development at the resistor may also be used to heat up the gas and compensate for the cooling loss which occurs during outflow.

All of the above solutions are based on coupling energy produced either directly or indirectly by electrical or magnetic means into the container and especially into the gas.

Figure 6A:
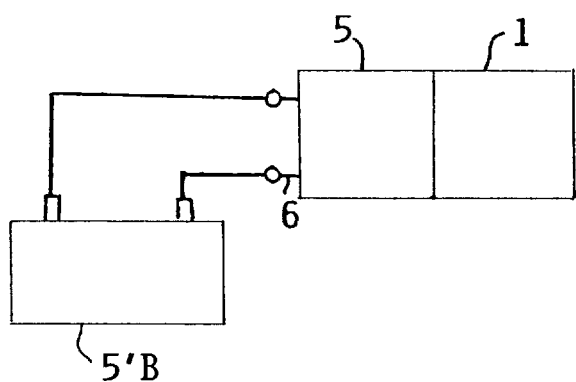
FIG. 6a: schematically shows a variant using a car battery as an electrical power source.
Figure 6B:
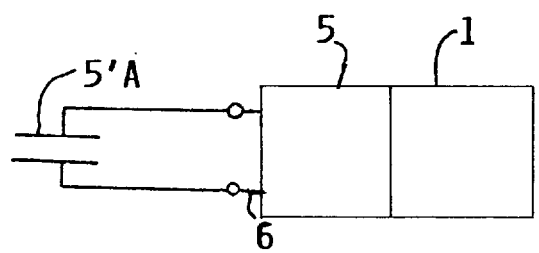
FIG. 6b: schematically shows a variant using a capacitor as an electrical power source.

To supply the energy source 5, as shown schematically in FIG. 6a, the car battery 5'B provided in the vehicle may be used as the power source 5'; its energy contents may be made available completely or partially over the time required by means of suitable measures (e.g. short circuit). If the device is triggered, this solution provides the advantage of the battery being discharged, thus preventing vehicle fires caused by battery arcing or the like in the event of an accident. However, it is also possible to implement other or additional power sources 5' (e.g. capacitors 5'A as shown schematically in FIG. 6b) that will supply the energy source 5 with the necessary energy.

Also, other variants can be implemented such as combinations comprising electric and magnetic energy, or combinations comprising electric or magnetic energy in conjunction with chemical energy.

What is claimed is:

1. A gas generator for use in a vehicle occupant restraint system, comprising a gas container having an outlet aperture, a gas contained under pressure within said container, a closure closing said outlet aperture, two electrodes arranged spaced from one another within said gas container adjacent and spaced from an inner side of said closure facing and exposed to said gas with a gap between said electrodes and said closure, and an electrical power source that is respectively connected to said two electrodes and that is adapted to cause an electrical discharge between said electrodes.

2. The gas generator according to claim 1, wherein said electrical power source comprises a capacitor.

3. The gas generator according to claim 1, wherein said gas comprises a mixture of an inert gas and a reactive gas.

4. The gas generator according to claim 1, excluding any combustible pyrotechnic propellant.

5. The gas generator according to claim 1, excluding all pyrotechnic components.

6. The gas generator according to claim 1, wherein said electrical power source comprises a vehicle battery that is connected to said electrodes in such a manner that said battery is adapted to be substantially completely discharged by providing electrical energy to said electrodes.

7. A gas generator for use in a vehicle occupant restraint system, comprising a gas container having an outlet aperture, a gas contained under pressure within said container, a closure closing said outlet aperture, an electrode arranged within said gas container adjacent and spaced from an inner side of said closure facing and exposed to said gas with a gap between said electrode and said closure, and an electrical power source that is respectively connected to said electrode and to said closure, and that is adapted to cause an electrical discharge across said gap.

8. The gas generator according to claim 7, wherein said electrical power source comprises a capacitor.

9. The gas generator according to claim 7, wherein said gas comprises a mixture of an inert gas and a reactive gas.

10. The gas generator according to claim 7, excluding any combustible pyrotechnic propellant.

11. The gas generator according to claim 7, excluding all pyrotechnic components.

12. The gas generator according to claim 7, wherein said electrical power source comprises a vehicle battery that is connected to said electrode and to said closure in such a manner that said battery is adapted to be substantially completely discharged by providing electrical energy to said electrode and to said closure.

13. A gas generator for use in a vehicle occupant restraint system, comprising a gas container having an outlet aperture, a gas contained under pressure within said container, a closure closing said outlet aperture, an electrode arranged within said gas container adjacent and spaced from an inner side of said electrode facing and exposed to said gas with a gap between said electrode and said closure, and an electrode power source that is respectively connected to said electrode and to said closure, wherein said closure and said electrode each respectively are in the form of a capacitor plate, and together form a capacitor that is adapted to be electrically charged by said electrical power source.

14. The gas generator according to claim 13, wherein said electrical power source comprises a capacitor.

15. The gas generator according to claim 13, wherein said gas comprises a mixture of an inert gas and a reactive gas.

16. The gas generator according to claim 13, excluding any combustible pyrotechnic propellant.

17. The gas generator according to claim 13, excluding all pyrotechnic components.

18. The gas generator according to claim 13, wherein said electrical power source comprises a vehicle battery that is connected to said electrode and to said closure in such a manner that said battery is adapted to be substantially completely discharged by providing electrical energy to said electrode and to said closure.

* * * * *